Jan. 24, 1956  J. J. McLAUGHLIN  2,732,053
AMBIDEXTEROUS CONVEYOR
Filed Aug. 20, 1952  3 Sheets-Sheet 1
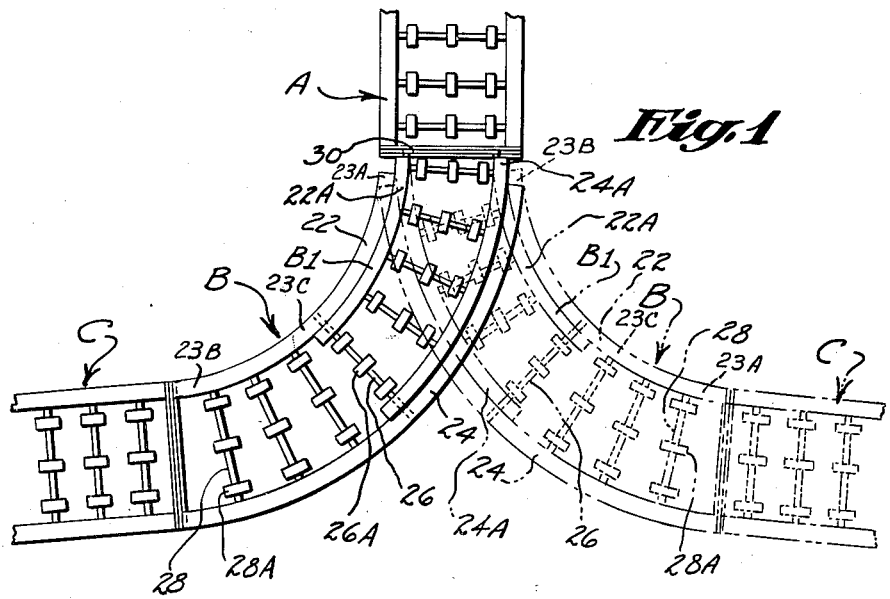
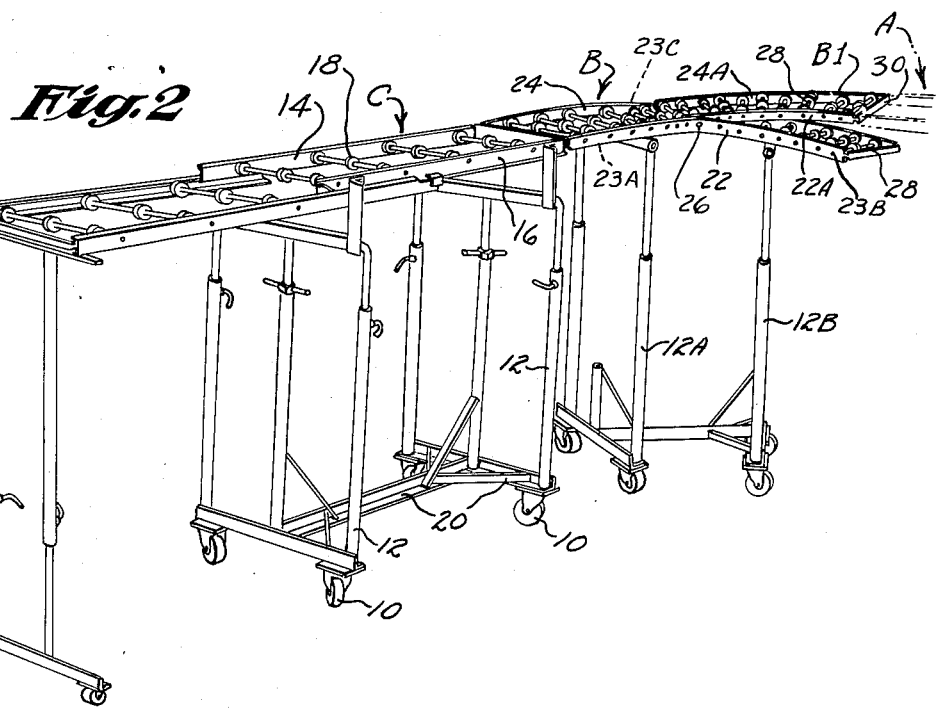
INVENTOR.
John J. McLaughlin
BY
Harry Langsam
Attorney

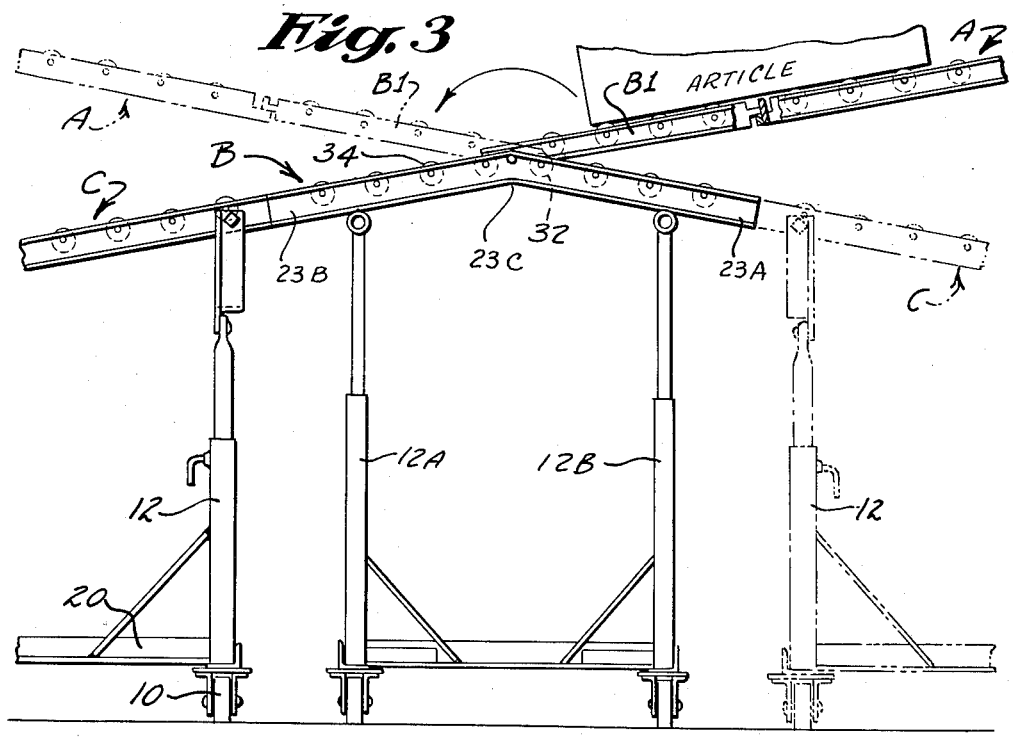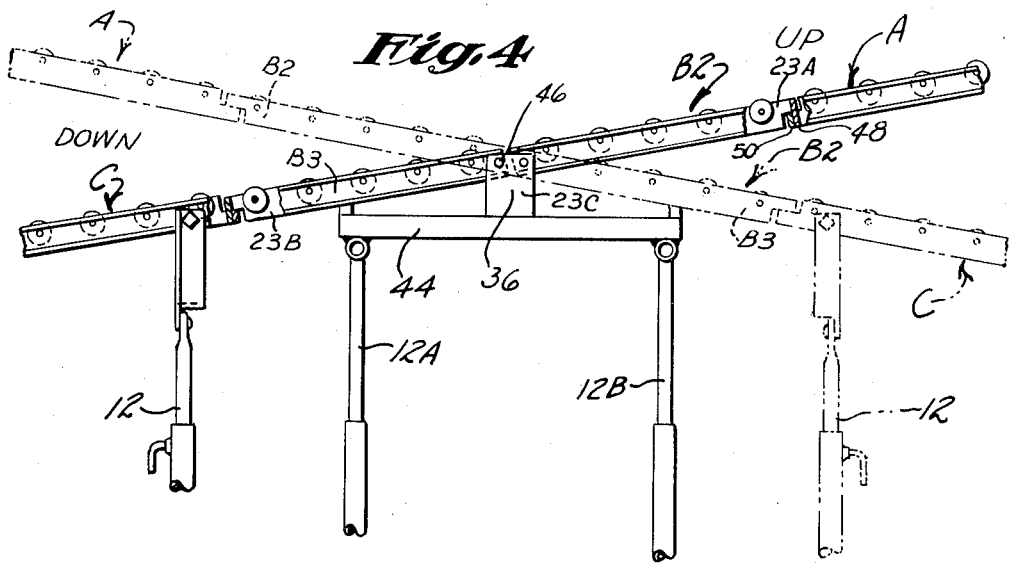

INVENTOR.
John J. McLaughlin
BY Harry Langsam
Attorney

United States Patent Office 2,732,053
Patented Jan. 24, 1956

2,732,053

AMBIDEXTEROUS CONVEYOR

John J. McLaughlin, Philadelphia, Pa., assignor to The Wilkie Company, Philadelphia, Pa., a partnership Application August 20, 1952, Serial No. 305,399

5 Claims. (Cl. 193—36)

My invention relates to conveyors and relates particularly to a conveyor wherein the direction of flow of articles can be changed 180° without any alteration in adjusting the elevators on the conveyor.

Heretofore, when conveyors were used to shift the direction of flow of articles from one direction to the opposite direction from a right angle position, it was necessary to make major adjustments in the end elevators of the 90° curved conveyor involving the expenditure of from 30 minutes to one hour in making the necessary adjustments.

It, therefore, is an object of my invention to provide a curved section of a conveyor wherein the direction of flow of articles may be changed without any change in elevation of the ends of the conveyors.

Another object of my invention is to provide an ambidexterous conveyor which may be turned to 180° to change the direction of flow of articles simply by changing the position of the conveyor.

Another object of my invention is to provide a conveyor where the direction of flow of the articles may be rapidly changed from a flow of 90° to the right to a flow of articles of 90° to the left.

Other objects of my invention are to provide an improved device of the character described, that is easily and economically produced, which is sturdy in construction, and which is highly effective in operation.

With the above and related objects in view, my invention consists in the details of construction and combination of parts, as will be more fully understood from the following description, when read in conjunction with the accompanying drawing in which:

Fig. 1 is a plane view of the travel of the articles to the left (as Fig. 1 is viewed) and in dotted lines, the travel of the articles is to the right.

Fig. 2 is a perspective view of the conveyor embodying my invention.

Fig. 3 is a side elevational view of the conveyor embodying my invention.

Fig. 4 is a side view of a modification of my invention.

Referring now in detail to the drawings wherein similar reference characters refer to similar parts, I show a conventional conveyor, generally designated as A, wherein a curved section, generally designated as B, joins the conveyor A to a second conventional section, generally designated as C.

Figure 5:
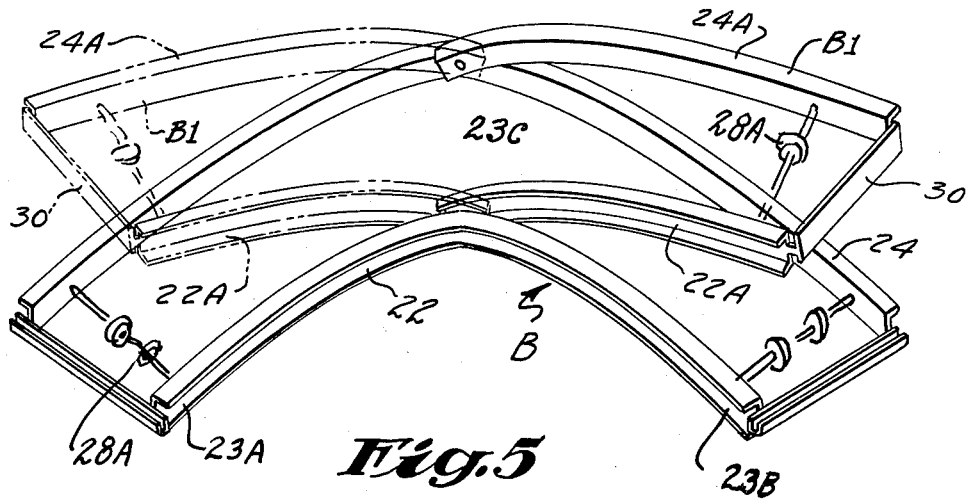
Fig. 5 is a perspective view of the curved portion of a conveyor embodying my invention.

The conveyor sections A and C may be of the type as disclosed in my previously filed patent application Serial No. 721,909, filed January 14, 1947, now Pat. No. 2,613,789 and Serial No. 130,761, filed December 2, 1949, now Pat. No. 2,613,788.

The section A comprises castors 10, vertically adjustable posts 12, side guide rails 14, 16 and rollers 18 which are engaged by the article conveyed. The side guide rails prevent the articles which flow or travel on the conveyor in line from falling off.

The conveyor section B embodying my invention comprises a plurality of castors 10, vertically adjustable posts 12A and 12B, channel angle irons and suitable braces 20 and curved side arms or rails 22, 24.

The side arms 22, 24 are constructed to have the highest elevation along the center shaft or pivot 26 on which rollers 26A are mounted.

In other words the curved side rail 22 is constructed so that its center 23C is elevated with respect to its ends 23A, 23B.

The end shaft 28 supporting a plurality of rollers 28A and mounted upon the side arms is at a lower level than the center shaft 26, thereby rendering the curved conveyor unit B ambidexterous or equally facile at each end for directing the flow or conveyance of articles.

The posts 12A and 12B hold the ends of the rails 22, 24 at the same level, while the center shaft 26 and the rollers 26A thereon is at the higher level. A segmental curved section, generally designated as B1, is pivotally connected to the center shaft 26 and it has curved side rails 22A, 24A. The curved section B1 subtends an arc of approximately 45°. In other words, the segmental curved section conveyor B1 has both its upper surface and its lowermost surface identical so far as the effect of the rollers is concerned so that when the curved conveyor section B1 has its free end either above the post 12A or the post 12B the free end of the section B1 is at the uppermost level (see Figs. 3 and 5).

Therefore, to have the direction of articles flow from A to C (center to the left), viewing Fig. 1, the section B is connected as shown in solid lines. To change the direction of flow of articles from the center to the right, the section B is rotated clockwise 90° so that the end 23B of the curved section B adjacent C moves adjacent section A and the pivoted conveyor section B1 is turned over as shown in Fig. 5.

It is to be recalled that in the use of conveyors advantage is taken of the inclination so that one end of the conveyor is higher than the other end.

In Fig. 3 the adjacent rollers 32, 34 serve as stop to limit the inclined position of the curved section B1.

In Fig. 4 I show a modification of my invention wherein two curved sections, generally designated as B2 and B3, are pivotally mounted upon a pair of vertical standards 36 mounted upon a table 44.

The curved section B2, having its rails lie in the same plane, is pivoted at 46 to the standards 36 and has a hooked end 48. The curved section B2 is fixedly held in a tilting position by a plurality of hooks being adapted to engage a complementary keeper 50 at one end of the conveyor A.

The curved section B3 complementary to section B2 subtends an angle of approximately 45°.

In Fig. 4 the standards 36 are mounted upon a base 44 which is supported by verticals arranged adjustable-in-height legs 12A and 12B.

Hence, to alter the direction of travel of articles through 180° without adjusting the legs 12A and 12B the conveyor sections B2 and B3 are moved 180° on a horizontal plane, and the section B2 lowered while the section B3 is raised. Hence, the direction of travel of articles on the conveyor may be changed 180° without adjusting the height supporting legs.

Figure 6:
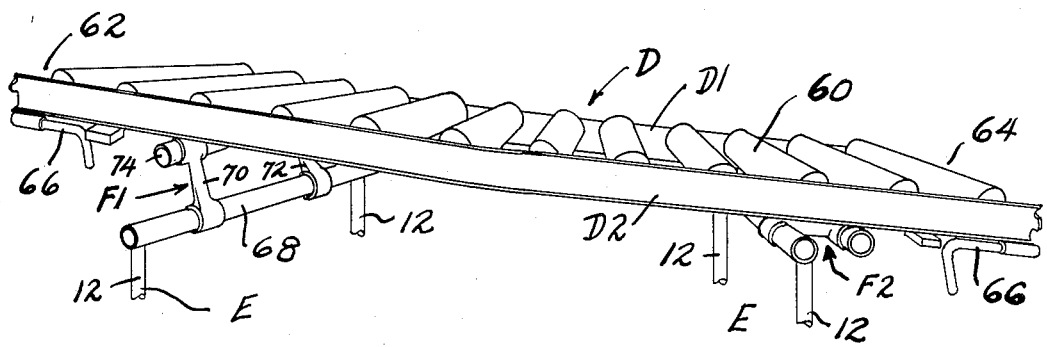
Fig. 6 is a perspective view of another modification of an ambidextrous conveyor wherein the travel of the article is from left to right.
Figure 7:
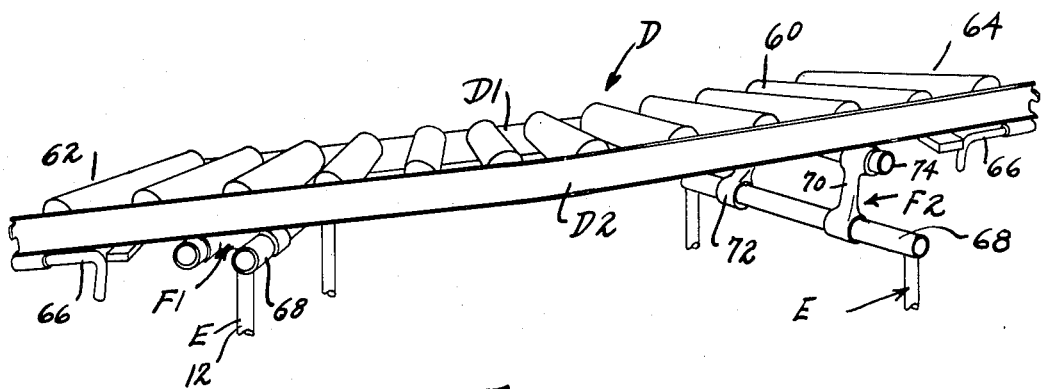
Fig. 7 is another perspective view of the conveyor shown in Fig. 6 wherein the direction of flow is from right to left.

In Figs. 6 and 7, I show a modification of my invention wherein a curved conveyor is generally designated as D. The conveyor D has a pair of curved side rails D1, D2 which have a plurality of rollers 60 suitably joined to each of the side rails. The transverse ends 62, 64 when projected subtend an angle of 90°. A sliding hook 66 enables the curved conveyor D to be hooked to adjoining conveyor members (not shown).

A plurality of stands or supports, generally designated as E, carry vertically extending legs 12 and horizontally located tie rod 68.

A swinging unit, generally designated as F1, joins one end of the conveyor D to one of the stands E. The swinging unit F1 has one end of each of a pair of arms 70, 72 pivotally joined to the cross arm 68 the other end of each arm 70, 72 is pivotally connected to a cross arm 74 rigidly joined to the side rails D1, D2.

A second swinging and supporting unit, generally designated as F2, joins one end of the curved conveyor D to a second stand or support E.

The operation and function of the ambidexterous conveyor illustrated in Figs. 6 and 7 is as follows:

In Fig. 6 the flow of goods is from left to right so that the swinging unit F1 is raised and the swinging unit F2 is lowered. Now to shift the direction of flow of articles the stands E are shifted so that the flow of articles will be 180°, and the swinging unit F2 is raised and the swinging unit F1 is lowered.

The goods then travel from right to left without changing the height of the legs or of the stand E. The cross rod 68 serves as a stop when the rails D1 and D2 rest thereon.

In Figs. 1, 3, 5 and 6 different modifications are illustrated of a curved conveyor wherein the direction of flow of articles on a conveyor is changed from 0° to 180° but wherein the supporting legs need not be adjusted.

Although my invention has been described in considerable detail, such description is intended as being illustrative rather than limiting, since the invention may be variously embodied, and the scope of the invention is to be determined as claimed.

I claim as my invention:

1. A curved gravity sectional article conveyor wherein the articles coming from a single conveyor may be caused to travel in either of two directions 180° apart in a horizontal plane and wherein the height of the supporting legs for the conveyor need not be changed to adjust for pitch but remains the same when the direction of travel of the articles is changed 180°, comprising a plurality of arcuate conveyor sections which jointly subtend an angle of 90°, one of said arcuate sections being pivotally connected at one of its ends and having a free outer end, and means to engage the ground and to support said arcuate conveyor sections in a predetermined position, said pivotal connection of said one arcuate section being attached to substantially the 45° point of said other arcuate section and said pivoted section having its said outer free end adapted to be raised higher than its pivotal attachment in order to provide sufficient pitch to convey articles by gravity.

2. A curved gravity sectional article conveyor having pitch wherein the articles coming from a single conveyor may be caused to travel in either of two directions 180° apart in a horizontal plane wherein the height of the supporting legs need not be changed when the direction of travel of articles upon the conveyor is changed, comprising a first conveyor section having a plurality of rollers thereon, a second arcuate conveyor section pivotally connected to the center of said first conveyor section, means to enable the free end of said second conveyor to be elevated with respect to said center of said first named conveyor and overlying said first named conveyor whereby sufficient pitch is provided to convey articles by gravity, and a plurality of supporting legs to support the ends of said first named conveyor.

3. A curved gravity sectional article conveyor having pitch wherein the articles coming from a single conveyor may be caused to travel in either of two directions 180° apart in a horizontal plane, comprising an arcuate conveyor section having a plurality of rollers thereon, a second arcuate section pivotally connected to said first named conveyor section, and said arcuate conveyor section overlying said first named conveyor section whereby one end of said pivoted arcuate section may be raised higher than its pivotal connection in order to provide sufficient pitch to convey articles by gravity, and means to ground support said conveyor.

4. A curved gravity sectional article conveyor having pitch wherein the articles coming from a single conveyor may be caused to travel in either of two directions 180° apart in a horizontal plane, comprising a first arcuate conveyor section extending 45° having one free end and having a plurality of rollers thereon, a second arcuate conveyor section curved 90° from one end to its other end, said second conveyor underlying said first named conveyor and said first conveyor pivotally connected to said first named conveyor adjacent the center of said second arcuate conveyor whereby said free end may be raised higher than its pivotal connection in order to provide sufficient pitch to convey articles by gravity, and means to ground support said sections.

5. A curved gravity sectional article conveyor wherein the articles coming from a single conveyor may be caused to travel in either of two directions 180° apart in a horizontal plane and wherein the height of the supporting legs for the conveyor need not be changed to adjust for pitch but remains the same when the direction of travel of the articles is changed 180°, comprising a plurality of arcuate conveyor sections which subtend an angle of 90°, each of said arcuate sections being pivotally connected at one of its ends and each having a free outer end, and means to engage the ground and to support said arcuate conveyor sections in a predetermined position, said pivotal connections of each said arcuate sections being attached to substantially the 45° point adjoining one another and said pivoted sections having its said outer free ends adapted to be raised higher than its pivotal attachment in order to provide sufficient pitch to convey articles by gravity.

References Cited in the file of this patent

UNITED STATES PATENTS

| | | |
|---|---|---|
| 1,065,349 | Fletcher | June 24, 1913 |
| 1,222,598 | Bernheim | Apr. 17, 1917 |
| 1,476,871 | Bledsoe | Dec. 11, 1923 |
| 2,704,143 | Cushman | Mar. 15, 1955 |

OTHER REFERENCES

Bulletin on Handling Methods by Rapids-Standard Company, Inc. Copy received in U. S. Patent Office Oct. 18, 1947. Page 3 relied on.

Bulletin No. 63 by Standard Conveyor Company. Copy received in U. S. Patent Office Aug. 12, 1949. Pages 5 and 7 relied on.